June 13, 1933.  R. E. WALLACE  1,914,224
LIGHT SOURCE
Filed April 9, 1930
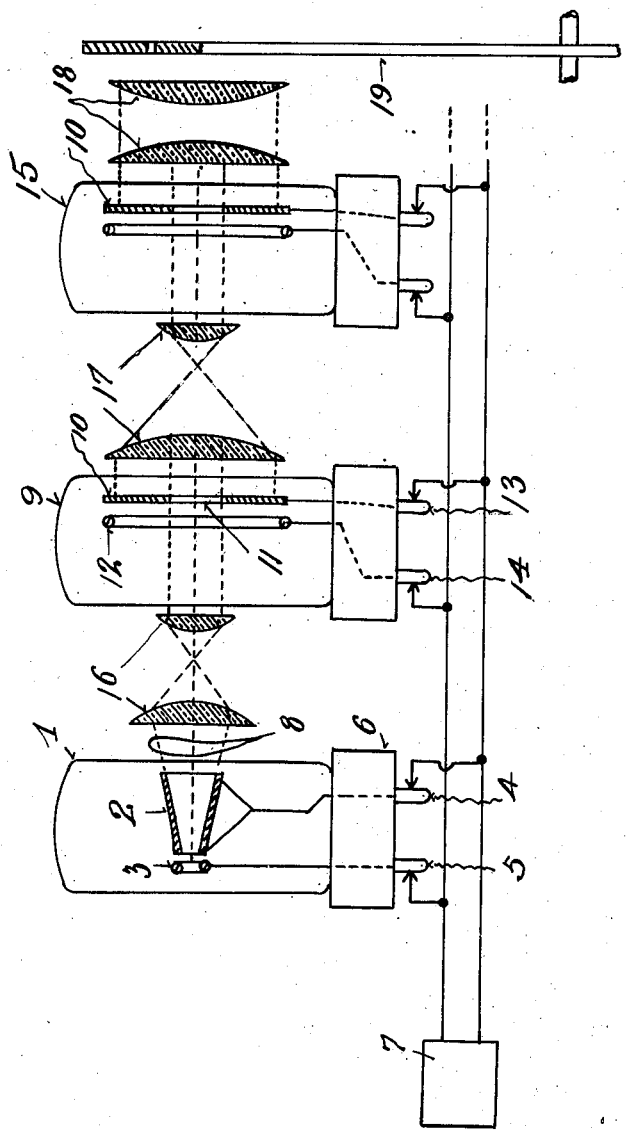
Inventor
RICHARD E. WALLACE
By his Attorneys
Darby & Darby Patented June 13, 1933

1,914,224

UNITED STATES PATENT OFFICE

RICHARD EDGAR WALLACE, OF NEW YORK, N. Y., ASSIGNOR TO JENKINS TELEVISION CORPORATION, OF JERSEY CITY, NEW JERSEY, A CORPORATION OF DELAWARE

LIGHT SOURCE

Application filed April 9, 1930. Serial No. 442,740.

This invention relates to novel methods and means for producing light beams, and with particularity to light beams suitable for use in signal recording or reproducing systems.

The principal object of the invention is to produce a high inductance light source capable of use in television, picture transmission or similar systems.

Another object of the invention is to provide a light source employing a gaseous discharge device having a maximum light intensity per unit area.

Another object of the invention is to produce a light source of the inert gaseous discharge type wherein the amount of light may be increased to any desired intensity and wherein the light variation may be accurately and readily controlled.

As is well known in the illumination art employing gaseous discharge light sources such as lamps employing a filling of neon or other inert conducting gases, the light intensity that can be produced by a given lamp is fundamentally limited by the area of the luminescent electrode. When it is attempted to increase the intensity of luminescence by increasing the current density a corresponding deterioration in the lamp electrodes is produced, and furthermore the regulation and accurate control of the light variation is rendered difficult. While for ordinary purposes of illumination the deterioration in the lamp electrodes and the irregularities of illumination may not be noticeable for some time, in such systems as television, picture transmission or the like it is absolutely necessary that the intensity of illumination be at all times proportionate to the impressed voltages, and furthermore it is absolutely necessary that each elemental area of the luminescent electrode have the same luminescent qualities as the other elemental areas. In overcoming the disadvantages of the prior art light sources of this type, and in achieving the objects of the invention it is proposed to employ a plurality of separate gaseous conduction lamps, each of which may be operated at its optimum current density and the light from all of the lamps is collected in such a manner as to produce a light beam having an intensity which is a multiple of the average intensity of each of the units, and wherein the luminescence is uniformly distributed.

A feature of the invention relates to a novel organization and arrangement of gaseous conduction lamps whereby a light beam of relatively large cross section and high intensity may be produced.

Another feature of the invention relates to a novel manner of combining the light from a plurality of separate gaseous conduction lamps to produce a single light beam of high intensity and relatively large area.

Another feature relates to a novel method of building up a high intensity light beam employing gaseous conduction lamps whereby one lamp is effective to produce the central area of the beam and the other lamp or lamps are arranged to produce the lateral portions of the light beam.

A further feature of the invention relates to a gaseous conduction lamp having a luminescent electrode with a central cutout portion whereby a substantially annular light source is produced.

A further feature of the invention relates to the combination of a gaseous conduction lamp employing a luminescent plate electrode having a non-luminous portion, in combination with a so-called crater type of conduction lamp for illuminating the non-luminescent portion of the electrode of the first mentioned lamp.

A still further feature relates to the organization, arrangement and relative location of parts whereby a light beam of high intensity, relatively large area and uniform light distribution may be attained.

Other objects and advantages not specifically enumerated will be apparent after a consideration of the following detail descriptions and the appended claims.

The figure is a schematic diagram of the apparatus.

In the drawing the numeral 1 represents generally a lamp of the so-called gaseous conduction type having a filling of neon, argon, helium or other similar gases at the required pressure. Suitably mounted within the lamp envelope is a hollow metal electrode 2 in the form of a truncated cone. Adjacent the smaller end of the electrode 2 is another ring-shaped electrode 3. The electrodes 2 and 3 are connected to suitable contacts 4 and 5 in the lamp base 6. These contacts as indicated in the drawing are connected to a suitable source of current having the requisite potential and indicated schematically by the numeral 7. When current flows through the lamp 1 the gas within the electrode 2 becomes luminescent and produces a relatively concentrated light beam in the form of a cone of light, as indicated by the numeral 8. Situated in front of the lamp 1 is another lamp 9, preferably having the same type of gas filling as the lamp 1. However the shape and structure of the electrodes employed in lamp 9 are different from those of lamp 1. As shown in the drawing the luminescent electrode 10 may be in the form of a plate having a central perforation or cutout portion 11 and mounted at the proper distance from the electrode 10 is a wire electrode 12. If the electrode 10 is in the form of a square then the electrode 12 may likewise take the form of a length of wire fashioned in the shape of a square. If desired the electrode 12 may be mounted at such a small distance away from the electrode 10 so that substantially no possible ionization occurs between the electrodes and the illumination is confined to the front face of the electrode 10. However this arrangement is not at all necessary and the entire surface of electrode 10 may be rendered luminescent if desired. The electrodes 10 and 12 are connected to corresponding contacts 13 and 14 and are adapted to be associated with the common current supply source 7. Situated in front of the lamp 9 is another lamp 15 which may be of the same construction as lamp 9. When current from source 7 is applied to lamps 9 and 15 each of said lamps will produce what may be termed an annular source of light, namely that defined by the luminescent area of the perforated electrodes 10. In order that the light from the three lamps may be utilized simultaneously, there is provided between each lamp a suitable optical system. Thus between the lamps 1 and 9 there is provided a lens system 16 which collects the light from lamp 1 and concentrates it in the form of a beam having substantially the same cross section as the opening 11 in electrode 10. With this arrangement therefore when both of the lamps 1 and 9 are energized there is produced a beam of light the lateral portion of which is derived from the luminescence of the electrode 10, while the central portion of which is produced by the electrode 2. Thus the current density is distributed between the electrodes 2 and 10 and consequently each of these electrodes may be operated at a higher luminescent intensity than was possible where a single electrode having a combined area of the electrodes 2 and 10 is used. In a similar manner there is situated between the lamp 9 and the lamp 15 an optical system 17 whereby the combined light beam from lamps 1 and 9 is collected and projected through the central perforated portion of the electrode 10 of lamp 15. In a similar manner the light from lamp 15 is combined with the light from both lamps 1 and 9 by means of a suitable optical system 18. This combined light beam may be used for any desired purpose. For example, as shown in the drawing the source 7 may take the form of a television analyzer for producing currents which vary in accordance with elemental areas of an image or visual representation to be produced as is well known in the television art. These currents after reception and suitable amplification are impressed in parallel upon each of the lamps 1, 9 and 15, whereby there is passed through the lens system 18 a light beam having the desired area and intensity, which intensity of course varies in accordance with the television signals. By means of a suitable integrating device 19 well known in the television art, such for example as the integrating device disclosed in application Serial No. 404,902 filed November 5, 1929, the high intensity light beam may be used to reproduce the original image.

While specific structures and organization of elements are disclosed in the drawing, it will be understood that the invention is not limited thereto. Thus instead of employing centrally perforated luminescent electrodes the electrodes may be made of any other desired complementary shape so that the light from each of the electrodes may be combined by suitable optical systems to provide a single light beam having an area which is a multiple of that of each of the individual luminescent electrodes, and having an intensity which is higher than that attainable in a single lamp having an electrode of correspondingly large area. Furthermore, while three separate lamps are shown in the drawing it will be understood that a lesser or greater number may be employed depending upon the intensity of light beam desired.

Other changes and modifications may be made without departing from the spirit and scope of the invention. Thus while the lamps 9 and 15 have been described as employing plate electrodes 10 with a central cutout portion, it will be understood that this cutout portion may be situated in any other part of the plate, and the plates 10 may either be circular, square, rectangular or any other shape depending upon the use to which the final composite light beam is put. Likewise instead of employing a crater type of lamp having a conically shaped electrode 2, the electrode may be in the form of a cylinder, or if desired, the luminescent electrode of lamp 2 may be in the form of a small circular or rectangular plate.

What is claimed is:

1. Means for producing a composite light beam comprising an evacuated envelope containing a luminescent plate-like electrode having a dark portion, another evacuated envelope having a plate-like luminescent electrode, means for applying a potential to said plate like electrodes whereby said electrodes become uniformly illuminated over their illuminating portions, means for optically projecting the light from one plate-like electrode through the other plate-like electrode, and means for combining the light from both of said electrodes to produce a single composite light beam having uniform light distribution.

2. Means for producing a composite light beam comprising a first luminescent plate electrode having a perforation, another luminescent electrode, and means for projecting a light from said other electrode through the perforation in the first mentioned electrode.

3. Means for producing a composite light beam comprising a luminescent plate electrode having a perforation, means for projecting a light beam through said perforation, and means for collecting the light from said luminescent plate electrode, and said light beam, to produce a single continuous light beam having substantially the same light boundary as that of said plate electrode.

4. In combination a first luminescent electrode a second luminescent electrode, and means for collecting the light from said second electrode and projecting it through a portion of the first electrode.

5. In combination a first gaseous conduction lamp having a luminescent electrode in the form of a perforated plate, another glow discharge lamp of the crater type in optical alignment with the said perforated portion of the plate of said first lamp.

6. Means for producing a single composite light beam comprising a crater type glow discharge lamp and a plurality of flat plate glow discharge lamps, means for projecting the light from the crater lamp through the plate electrodes of one of said discharge lamps, and means for optically collecting the light from all of said lamps and projecting it upon a surface to be illuminated in the form of a single composite beam of uniform light distribution suitable for use in television systems.

7. An illuminating system comprising a plurality of lamps each having an evacuated envelope with a filling of an inert gas, a pair of spaced electrodes therein, said lamps being mounted in row formation and in alignment, the electrodes in two of said lamps having a solid luminescent portion and a perforated non-luminescent portion, and means for collecting the light from the third of said lamps and passing it through the open portions of the electrodes in said other two lamps.

8. An illuminating system according to claim 7 in which a lens system is interposed between each adjacent pair of electrodes to collect the light from one of the lamps of the pair and projecting it in a parallel beam through the next adjacent lamp of the pair.

9. In combination a glow discharge lamp having an evacuated envelope containing a filling of an inert gas, and a plate-like electrode therein, and a ring electrode adjacent said plate-like electrode, another glow discharge lamp, means for projecting the light from said other lamp through the plate electrode of the first lamp, and means for combining the light from both of said lamps to produce a single composite light beam of uniform light distribution.

10. Illumination means comprising a glow discharge lamp of the crater type, a glow discharge lamp of the luminescent plate type, means for projecting the light from said crater lamp through the plate electrode of the glow discharge lamp, and means for collecting the light from both of said lamps and projecting the collected light upon a surface to be illuminated to produce a single composite beam having uniform illumination suitable for use in television systems.

In testimony whereof I have hereunto set my hand on this 31st day of March A. D., 1930.

RICHARD EDGAR WALLACE.